United States Patent [19]
Whitaker

[11] 3,930,520
[45] Jan. 6, 1976

[54] CONTROL VALVE

[76] Inventor: Eugene Whitaker, 3378 N. Avondale Ave., Chicago, Ill. 60618

[22] Filed: June 27, 1974

[21] Appl. No.: 483,563

[52] U.S. Cl. .......................... 137/625.21; 137/625.4
[51] Int. Cl.² .......................................... F16K 11/00
[58] Field of Search ..... 137/625.22, 625.21, 625.24; 251/304, 208, 209

[56] References Cited
UNITED STATES PATENTS

| | | | |
|---|---|---|---|
| 3,524,472 | 8/1970 | Faisandier | 137/625.21 |
| 3,608,866 | 9/1971 | Karpacheva | 137/625.21 X |
| 3,626,981 | 12/1971 | Bauer-Nilsen | 137/625.21 |

*Primary Examiner*—Martin P. Schwadron
*Assistant Examiner*—Robert J. Miller

[57] ABSTRACT

A control valve controls fluid to and from a motor or the like from a rotary shaft and it includes a pair of stationary valve members facing each other and having facing annular channels therein. The annular channel of one of said stationary valve members communicates with a motor passage leading to the motor. The annular channel of the other stationary valve member communicates with a source passage leading to the fluid source and with a vent passage leading to atmosphere. A pair of plugs secured in this latter annular channel provides an arcuate source channel and an arcuate vent channel. A rotatable valve disc driven by the rotary shaft and arranged between the stationary valve members has a port therethrough which alternately communicates the annular motor channel in said one stationary valve member with the arcuate source channel and the arcuate vent channel in the other stationary valve member for controlling the fluid to and from the motor or the like. The rotatable valve disc preferably includes a pair of discs and intermediate resiliently compressible means. The control valve also preferably includes a housing for receiving the stationary valve members and the rotatable valve disc. Lubricating means are also provided for lubricating the running contact between the rotatable valve disc and the stationary valve members.

25 Claims, 8 Drawing Figures

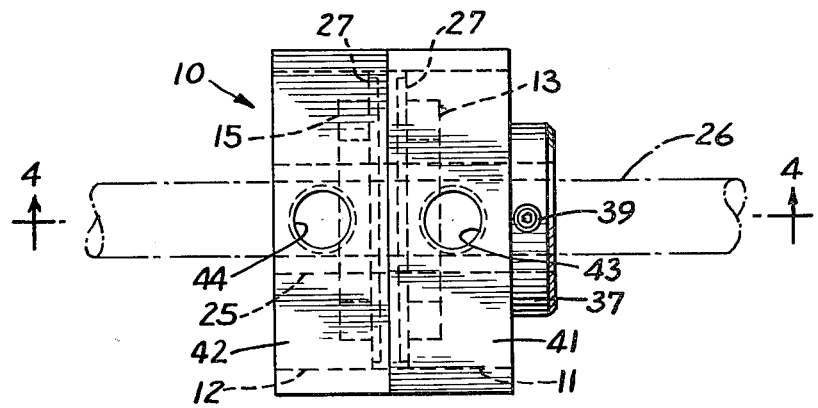
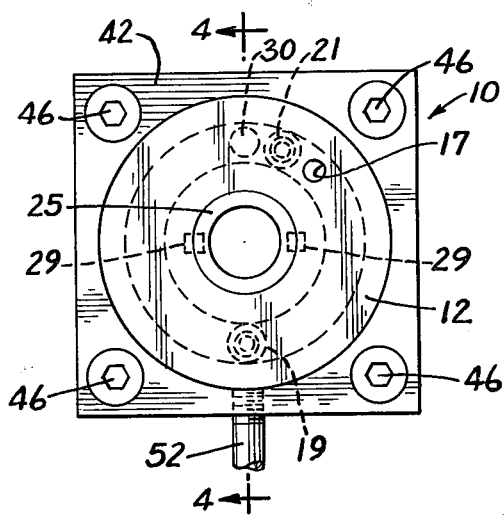
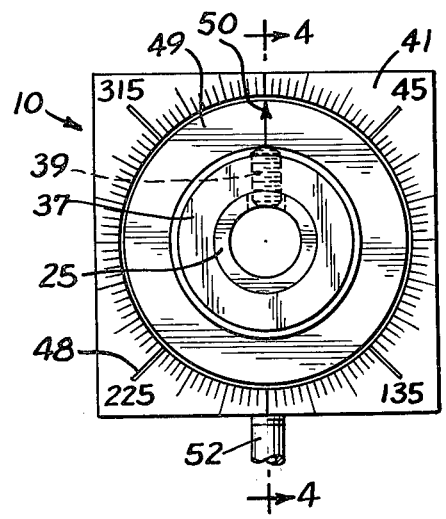
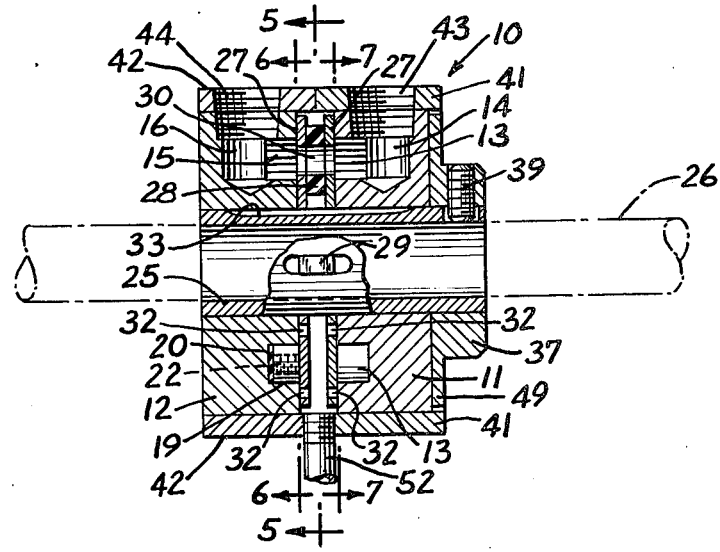

CONTROL VALVE

This invention relates to a control valve for timing and controlling the operation of a fluid motor or the like in accordance with the rotation of a rotary shaft. Such a control valve is particularly useful for timing and controlling servomotors and machinery or the like for performing desired work functions therein in timed relation with the operation of the machinery. The control valve of this invention is usable with a fluid, such as air, having a positive pressure source or a vacuum source and controls such fluid to and from the motor or the like from a rotary shaft.

The principal object of this invention is to provide a new and improved control valve for the aforementioned purposes which is accurate, efficient and foolproof in operation, which is simple and rugged in construction, and which may be inexpensively manufactured and assembled.

Briefly, in accordance with this invention, the control valve includes a pair of longitudinally spaced apart stationary valve members having aligned central holes therethrough for receiving the shaft and aligned facing annular channels. One of the stationary valve members has a motor passage communicating with the annular passage therein for connection to the motor. The other stationary valve member has a source passage communicating with the annular channel therein for connection to a source of fluid (whether it be a positive pressure or vacuum source) and a vent passage angularly spaced from the source passage and communicating with the annular channel therein for connection to atmosphere. A pair of plugs are removably secured in the annular passage of said other stationary valve member for isolating said source and vent passages from each other and for providing an arcuate source channel and an arcuate vent channel.

A rotatable valve disc is located between the pair of stationary valve members and engages the facing surfaces thereof. It also has a central hole therethrough for receiving the rotary shaft and an eccentrically located port therethrough for communicating the aligned facing channels in the stationary valve members. The rotatable valve disc is connected to the rotary shaft for rotation thereby for alternately communicating the annular channel and the motor passage in said one stationary valve member with the source channel and source passage and with the arcuate vent channel and vent passage in said other stationary valve member.

At least one of the plugs in said annular channel in said other stationary valve member is adjustably positionable therein for adjusting the relative times during which the motor passage in said one stationary valve member communicates with the source passage and vent passage in said other stationary valve member. The angular position of the rotatable valve disc with respect to the rotary shaft is also adjustable for adjusting the timing of the control valve.

Resilient means are also provided for applying running contact pressure between the rotatable valve disc and the facing surfaces of the stationary valve members. In this respect the rotatable valve disc preferably includes a pair of discs and intermediate resiliently compressible means, such as resiliently compressible washers, between the discs for applying the running contact pressure.

In addition to the foregoing, the control valve also preferably includes a housing having a central cavity receiving the stationary valve members and rotatable valve disc and radially arranged motor and source holes communicating respectively with the motor and source passages (which are also preferably radially arranged) in the stationary valve members. These holes in the housing provide means for connection to the motor and the fluid source. The vent passage leading to the atmosphere is preferably longitudinally arranged. The housing is preferably a two part housing, with one of the stationary valve members secured by force fit into one of the housing parts and the other stationary valve member secured by force fit into the other housing part. Preferably, the rotary valve disc is secured to a sleeve which receives the rotary shaft and which extends longitudinally through the control valve, the sleeve being externally adjustably secured to the rotary shaft. The control valve also includes lubricating means for lubricating the running parts of the control valve.

Further objects of this invention reside in the details of construction of the control valve and in the cooperative relationships between the component parts thereof.

Other objects and advantages of this invention will become apparent to those skilled in the art upon reference to the accompanying specification, claims and drawings in which;

FIG. 1 is a top plan view of the control valve its relation to the rotary shaft.

FIG. 2 is a side elevational view of the control valve looking from the left of FIG. 1.

FIG. 3 is a side elevational view of the control valve looking from the right of FIG. 1.

FIG. 4 is a vertical sectional view through the control valve taken substantially along the line 4—4 of FIGS. 1, 2 and 3.

Figure 6:
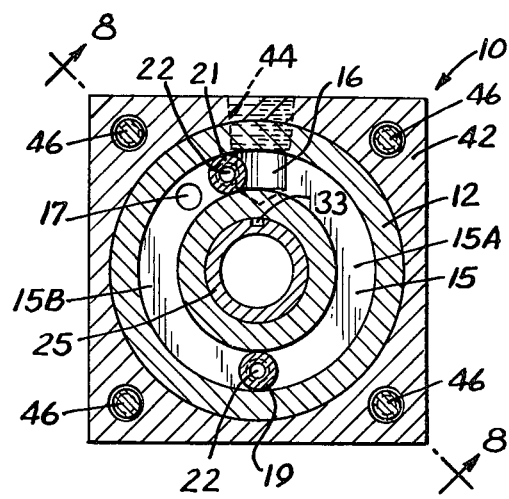
FIG. 6 is a vertical sectional view of the control valve taken substantially along the line 6—6 of FIG. 4.
Figure 7:
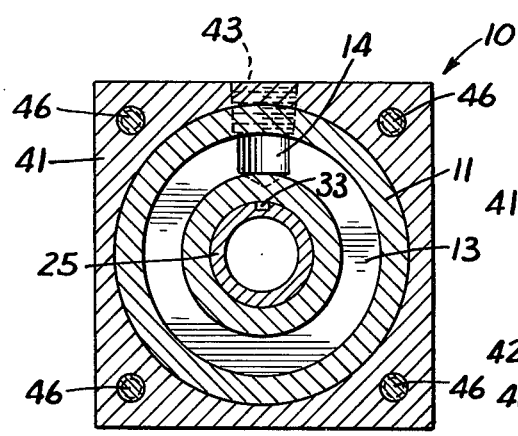
FIG. 7 is a vertical sectional view through the control valve taken substantially along the line 7—7 of FIG. 4.
Figure 8:
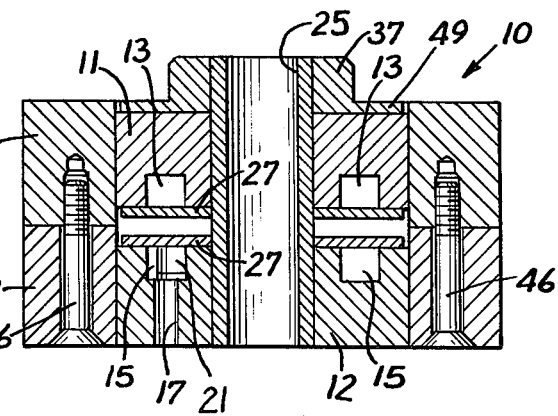
FIG. 8 is a sectional view through the control valve taken substantially along the line 8—8 of FIG. 6.

The control valve of this invention is generally designated at 10 in the drawings. Referring first to FIGS. 4, 6 and 7 the control valve includes a pair of longitudinally spaced apart stationary valve members 11 and 12 which face each other, which have aligned central holes therethrough and which have aligned facing annular channels 13 and 15 respectively. The stationary valve member 11 has a motor passage 14 which communicates with the annular channel 13. The other stationary valve member 12 has a source passage 16 communicating with the annular channel 15 and an angularly spaced vent passage 17 also communicating with the annular channel 15. Preferably, the motor passage 14 and the source passage 16 extend radially outwardly from the annular channels 13 and 15 while the vent passage 17 extends longitudinally outwardly from the annular channel 15. The stationary valve members 11 and 12 may be made from any suitable material, cast iron being preferred.

A pair of plugs 19 and 21, which are preferably formed from cast iron, are removably secured by force fit in the annular channel 15 of the stationary valve member 12 for the purpose of isolating the source passage 16 and the vent passage 17 from each other and for providing an arcuate source channel 15A and an arcuate vent channel 15B. The plugs 19 and 21 are substantially cylindrical and when they are force fit into the annular channel the substantially cylindrical sides thereof forcefully engage the sides of the channel to hold them in place and to effectively seal the sides of the channel. Preferably, the inner ends of the plugs 19 and 21 have resiliently compressible pads or washers 20, such as silicone rubber, bonded thereto for contacting and sealing the bottom of the channel 15. The plugs, also, are preferably provided with tapped holes 22 for receiving a suitable screw threaded tool to facilitate removal of the plugs from the channel 15.

Figure 5:
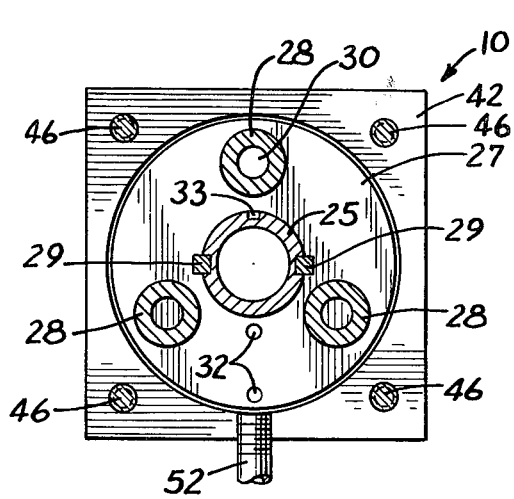
FIG. 5 is a vertical sectional view through the control valve taken substantially along the line 5—5 of FIG. 4.

A sleeve 25 formed of steel tubing is received in the aligned central holes through the stationary valve members 11 and 12 and this sleeve receives the rotary shaft 26 which operates the control valve. About the sleeve 25 and arranged between the facing surfaces of the stationary valve members 11 and 12 is a rotatable valve disc which is secured for rotation by keys 29 to the sleeve 25. This rotatable valve disc preferably comprises a pair of discs 27 and intermediate resiliently compressible means in the form of a plurality of resiliently compressible washers 28. The discs 27 may be formed of bronze or, preferably, low carbon steel hardened and ground and the resiliently compressible washers 28 may be formed of silicon rubber (70 durometer) elastomeric material, the discs and washers being firmly bonded together. The resiliently compressible washers 28, as illustrated in FIG. 5, expose the inner facing surfaces of the discs 27 about the washers. The resiliently compressible washers 28 operate to apply a running contact pressure between the outer surfaces of the discs 27 and the facing surfaces of the stationary valve members 11 and 12. The rotatable valve disc, comprising the discs 27, and one of the washers 28, has an eccentrically located port 30 extending therethrough and communicating with the facing channels 13 and 15 in the stationary valve members. The low carbon steel or bronze discs 27 running against the facing surfaces of the cast iron stationary valve members 11 and 12 form a very effective and long-lasting running seal.

With the rotatable valve disc 27, 28 in the position illustrated in FIG. 5, the port 30 through the valve disc communicates the annular motor channel 13 with the arcuate source channel 15A so as to connect the fluid source to the motor. As the valve disc is rotated in the clockwise direction as illustrated in FIGS. 5 and 6, this communication is maintained until the port 30 overlies the plug 19 whereupon this communication is interrupted. Upon further rotation of the valve disc in the clockwise direction, the port 30 in the valve disc communicates the annular motor channel 13 with the arcuate vent channel 15B so as to communicate the motor with the vent to atmosphere. This venting condition remains upon further rotation of the valve disc unitl the port 30 therein passes over the plug 21 so as to interrupt this communication. Continued rotation of the valve disc repeats the aforementioned cycle of operation. By positioning the plug 19 at various points in the annular channel 15, the relative lengths of the arcuate source channel 15A and the arcuate vent channel 15B may be adjusted as desired so as to adjust the relative times during which the motor passage 14 in the stationary valve member 11 communicates with the source passage 16 and vent passage 17 in the other stationary valve member 12. Usually, the position of the plug 19 is determined during assembly in accordance with prescribed specifications for said relative times. If, in the field, different relative times are desired, the plug 19 may be removed and replaced in the desired different position.

The space between the valve discs 27 around the washers 28 is preferably supplied with a suitable lubricant, and the valve discs are each provided with a pair of lubricating holes 32 for supplying lubricant from between the valve discs 27 to the facing surfaces of the stationary valve members 11 and 12 to lubricate the running surface of the valve discs 27 and the stationary valve members 11 and 12. The sleeve 25 is also provided with a lubricating groove 33 communicating with the space between the valve discs 27 and extending along the sleeve 25 into the central holes in the stationary valve members 11 and 12 for supplying lubricant from between the valve discs to lubricate the running contact between the sleeve 25 and the central holes in the stationary valve members 11 and 12.

A knob 37 is received over the sleeve 25 where it extends from one end of the control valve. The sleeve 25 is provided with a hole through which a set screw 39 carried by the knob 37 extends. By rotating the knob 37 with respect to the rotary shaft 26, the position of the valve disc 27, 28 may be angularly adjusted as desired with respect to the shaft 26 and when the proper adjustment is obtained the set screw 39 is tightened against the shaft 26 to maintain this adjustment. By this arrangement the timing of the control valve with respect to the shaft 26 may be adjusted.

The control valve 10 also preferably includes a housing formed of two parts 41 and 42, each having a central cavity therethrough. The stationary valve member 11 is secured by force fit in the cavity of the housing part 41 and the stationary valve member 12 is secured by force fit in the cavity of the housing part 42. In so securing the stationary valve members 11 and 12 in the cavities in the housing parts 41 and 42 they are force fit inserted to a depth so as to properly space apart the facing surfaces of the stationary valve members 11 and 12 when the two housing parts 41 and 42 are brought together in abutting relation. The housing part 41 has a radially arranged motor port 43 in alignment with the radially arranged motor passage 14 in the stationary valve member 11 and, likewise, the housing part 42 has a radially arranged source port 44 in radial alignment with the radially arranged source passage 15 in the stationary valve member 12. The motor passage 13 and the motor port 43 may be formed in one drilling operation at the same time after the stationary valve member 11 is secured by force fit in the housing part 41. Likewise, the source passage 16 and the source port 44 may also be formed in the same drilling operation after the stationary valve member 12 is secured by force fit in the housing part 42. In any event, after the assembly of the stationary valve members 11 and 12 in the housing parts, 43 and 44, respectively the motor passage 14 and motor port 43 and the source passage 16 and source port 44 are tapped to receive a threaded conduit extending to the motor and a threaded conduit extending to the fluid source. Since the threaded conduits extend into the threaded passages 14 and 16 as well as through the threaded ports 43 and 44, no seals are required for sealing the motor passage 14 and the source passage 16.

After the assembly of the stationary valve members 11 and 12 in the housing parts 41 and 42 as described above the removable plugs 20 are inserted in the annular groove 15 of the stationary valve member 12 as described above. The valve disc 27, 28 is then keyed to the sleeve 25 and the assemblies of the housing parts 41, 42 and stationary valve members 11 and 12 are inserted over the sleeve 25 with the valve disc 27, 28 therebetween. The housing parts 41 and 42 are then brought together in abutting relation and the housing parts are secured in abutting relation by means of screws 46.

The housing part 41 is provided with indicia 48 and a flange 49 on the knob 37 having a pointer 50 cooperates with the indicia 48 to indicate the rotative position of the port 30 in the valve disc 27, 28 with respect to the housing for indicating the time of the control valve.

Where the housing parts 41 and 42 abut each other they may be provided with a suitable tapped hole for receiving a threaded conduit 52 in those instances where the control valve utilizes a fluid source which is under positive pressure as distinguished from a vacuum source. This conduit 52 may be connected to the source of positive pressure so as to apply positive pressure about the resiliently compressible washers 28 between the valve discs 27 so as to increase the running contact pressure between the valve discs 27 and the facing surfaces of the stationary valve members 11 and 12. This positive pressure exerted on the inside of the valve discs 27 about the washers 28 operates to counteract positive pressure in the annular channel 13 when the control valve operates to control fluid under positive pressure.

While for purposes of illustration one preferred form of this invention has been disclosed, other forms thereof may become apparent to those skilled in the art upon reference to this disclosure and, therefore, this invention is to be limited only by the scope of the appended claims.

I claim:

1. A control valve for controlling fluid to and from a motor or the like from a rotary shaft comprising a pair of longitudinally spaced apart stationary valve members facing each other and having aligned central holes therethrough receiving the rotary shaft and aligned facing annular channels, one of said stationary valve members having a motor passage communicating with the annular channel therein for connection to the motor, the other of said stationary valve members having a source passage communicating with the annular channel therein for connection to a source of fluid and a vent passage angularly spaced from the source passage and communicating with the annular channel therein for connection to atmosphere, a pair of plugs removably secured in the annular channel of said other stationary valve member isolating said source passage and said vent passage from each other and providing a arcuate source channel and an arcuate vent channel, a rotatable valve disc between the pair of stationary valve members and engaging the facing surfaces thereof and having a central hole therethrough receiving the rotary shaft and an eccentrically located port therethrough communicating the aligned facing annular channels in the stationary valve members, and means connecting the valve disc to the rotary shaft for rotation thereby for alternately communicating the annular channel and the motor passage in said one stationary valve member with the arcuate source channel and source passage and with the arcuate vent channel and vent passage in said other stationary valve member.

2. A control valve as defined in claim 1 wherein at least one of said plugs in the annular channel in said other stationary valve member is adjustably positionable therein for adjusting the relative times during which the motor passage in said one stationary valve member communicates with the source passage and vent passage in said other stationary valve member.

3. A control valve as defined in claim 1 including means adjusting the time of the control valve with respect to the rotary shaft.

4. A control valve as defined in claim 1 including a rotatable sleeve received in the holes through the stationary valve members and the rotatable valve disc and receiving the rotary shaft, means securing the rotatable valve disc to the rotatable sleeve rotation therewith, and means for rotatably adjustably securing the rotatable sleeve to the rotary shaft for adjusting the timing of the control valve with respect to the rotary shaft.

5. A control valve as defined in claim 1 including supplying lubricant to the running contact between the stationary valve members and the rotatable valve disc.

6. A control valve as defined in claim 1 including resilient means applying running contact pressure between said rotatable valve disc and said facing surfaces of said stationary valve members.

7. A control valve as defined in claim 6 including supplying lubricant to the running contact between the stationary valve members and the rotatable valve disc.

8. A control valve as defined in claim 1 wherein said rotatable valve disc comprises a pair of spaced discs rotatably engageable with the facing surfaces of said stationary valve members, and intermediate resiliently compressible means between said discs and bonded thereto applying running contact pressure between said discs and said facing surfaces of said stationary valve members, said eccentrically located port of the valve disc extending through the pair of discs and the intermediate resiliently compressible means.

9. A control valve as defined in claim 8 wherein said intermediate resiliently compressible means comprises a plurality of circumferentially spaced resiliently compressible washers bonded to the pair of discs with the eccentrically located port of the valve disc extending through the pair of discs and one of the washers.

10. A control valve as defined in claim 8 wherein the space between the pair of discs of the rotatable valve disc contains a lubricant and wherein the pair of discs contain lubricating holes in longitudinal alignment with the facing surfaces of the stationary valve members for lubricating the running contact between the stationary valve members and the rotatable valve disc.

11. A control valve as defined in claim 1 wherein said motor and source passages in said stationary valve members are radially arranged and including a housing having a central cavity receivings said stationary valve members and said rotatable valve disc therein and having radially arranged motor and source holes in radial alignment and communicating respectively with the motor and source passages in said stationary valve members.

12. A control valve as defined in claim 11 wherein said vent passage is longitudinally arranged in said other stationary valve member.

13. A control valve as defined in claim 1 including a two part housing, the two housing parts including aligned central cavities therethrough, said one stationary valve member being secured by force fit in the central cavity of one of the housing parts and said other stationary valve member being secured by force fit in the central cavity of the other housing part, and means securing together the two parts of the housing in abutting relation with the valve disc between and engaging the facing surfaces of the stationary valve members.

14. A control valve as defined in claim 13 wherein said motor and source passages in said stationary valve members are radially arranged and wherein said two part housing has radially arranged motor and source holes in radial alignment and communicating respectively with the motor and source passages in said stationary valve members.

15. A control valve as defined in claim 13 wherein said vent passage is longitudinally arranged in said other stationary valve member.

16. A control valve as defined in claim 8 including a rotatable sleeve received in the holes through the stationary valve members and the pair of discs of the rotatable valve disc and receiving the rotary shaft, means securing the pair of discs of the rotatable valve disc to the rotatable sleeve for rotation therewith, and means rotatably adjustably securing the rotatable sleeve to the rotary shaft for adjusting the timing of the control valve with respect to the rotary shaft.

17. A control valve as defined in claim 16 including indicating means rotatably positionable with the rotatable sleeve for indicating the timing of the control valve with respect to the rotary shaft.

18. A control valve as defined in claim 4 including indicating means rotatably positionable with the rotatable sleeve for indicating the timing of the control valve with respect to the rotary shaft.

19. A control valve as defined in claim 1 including a housing having a central cavity therein receiving said stationary valve members and said rotatable valve disc therein, a rotatable sleeve received in the holes through the stationary valve members and the rotatable valve disc and receiving the rotary shaft, means securing the rotatable valve disc to the rotatable sleeve for rotation therewith, means rotatably adjustably securing the rotatable sleeve to the rotary shaft for adjusting the timing of the control valve with respect to the rotary shaft, and cooperating indicating means carried by the housing and the rotatable sleeve for indicating the timing of the control valve with respect to the rotary shaft.

20. A control valve as defined in claim 1 wherein the fluid from the source is under positive pressure and wherein said rotatable valve disc comprises a pair of discs rotatably engageable with the facing surfaces of said stationary valve members, and intermediate resiliently compressible means between said discs and bonded thereto for applying running contact pressure between said discs and said facing surfaces of said stationary valve members, said intermediate resiliently compressible means having a configuration to internally expose portions of said discs, and means to supply fluid under positive pressure from the fluid source to the internally exposed portions of the discs for increasing the running contact pressure between said discs and said facing surfaces of said stationary valve members.

21. A control valve as defined in claim 1 wherein said pair of plugs are removably secured by force fit in the annular channel of said other stationary valve member.

22. A control valve as defined in claim 21 wherein the plugs are tapped to receive a tool to facilitate removal thereof from the channel.

23. A control valve as defined in claim 1 wherein said pair of plugs are substantially cylindrical in configuration and are removably secured by force fit in the annular channel of said stationary valve member with the cylindrical sides of the plugs engaging the sides of the channel.

24. A control valve as defined in claim 23 wherein the ends of the substantially cylindrical plugs have resiliently compressible pads bonded thereto for resiliently engaging the bottom of the channel when the plugs are so secured in the channel.

25. A control valve as defined in claim 23 wherein the substantially cylindrical plugs are centrally and longitudinally tapped to receive a tool to facilitate removal thereof from the channel.

* * * * *